US010935677B2

(12) United States Patent
Immel et al.

(10) Patent No.: US 10,935,677 B2
(45) Date of Patent: Mar. 2, 2021

(54) IMAGE PLATE CALIBRATION SYSTEM

(71) Applicant: Savannah River Nuclear Solutions, LLC, Aiken, SC (US)

(72) Inventors: David M. Immel, Augusta, GA (US); John T. Bobbitt, III, Evans, GA (US); Jean R. Plummer, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 1000 days.

(21) Appl. No.: 14/661,624

(22) Filed: Mar. 18, 2015

(65) Prior Publication Data

US 2016/0274041 A1    Sep. 22, 2016

(51) Int. Cl.
*G01T 7/00* (2006.01)
*G01T 1/10* (2006.01)
*G03B 42/00* (2006.01)

(52) U.S. Cl.
CPC ............... *G01T 7/005* (2013.01); *G01T 1/10* (2013.01); *G03B 42/00* (2013.01)

(58) Field of Classification Search
CPC ......... G01T 1/20; G01T 1/105; G01T 1/1648; G01T 1/2012; G01T 1/08; G01T 1/10; G01T 7/005; G03B 42/00; G03B 42/02; G03B 42/04
USPC ..... 250/580, 252.1, 370.09, 584, 484.4, 582
See application file for complete search history.

(56) References Cited

U.S. PATENT DOCUMENTS

| | | | | | |
|---|---|---|---|---|---|
| 2,362,813 | A | * | 11/1944 | Gorey | G03B 15/00 396/389 |
| 2,369,247 | A | * | 2/1945 | Pratt | G03B 27/46 355/62 |
| 2,588,054 | A | * | 3/1952 | Smith | G03B 19/04 396/388 |
| 2,944,153 | A | * | 7/1960 | Brown | G01N 23/20025 378/120 |
| 3,226,999 | A | * | 1/1966 | Allison | F16D 7/048 74/10.41 |
| 3,266,366 | A | * | 8/1966 | Hunt | G03G 15/041 399/144 |
| 3,762,816 | A | * | 10/1973 | Wally, Jr. | G03B 27/60 355/73 |
| 4,893,011 | A | * | 1/1990 | Bauer | G03B 42/02 250/484.4 |
| 4,931,641 | A | * | 6/1990 | Ohgoda | G03B 42/02 250/484.4 |
| 5,065,021 | A | * | 11/1991 | Arakawa | G03C 5/17 250/588 |

(Continued)

FOREIGN PATENT DOCUMENTS

CA    2968842    6/2016

OTHER PUBLICATIONS

Farfan, et al., "Single-Faced GrayQb™ A Radiation Mapping Device," *Testing at SRNL*, Dec. 12, 2013; pp. 1-88. (http://www.osti.gov/scitech/biblio/110810).

*Primary Examiner* — Blake C Riddick
(74) *Attorney, Agent, or Firm* — Dority & Manning, P.A.

(57) ABSTRACT

A calibration system for an image plate used to detect high-energy particles produced by a radioisotope includes a casing and an image plate holder disposed at least partially inside the casing. The image plate is retained by the image plate holder inside the casing. A calibration source generates energy inside the casing to prepare the image plate for detection.

7 Claims, 3 Drawing Sheets

(56) References Cited

U.S. PATENT DOCUMENTS

| | | | | |
|---|---|---|---|---|
| 5,180,915 A * | 1/1993 | Ohgoda | G03B 42/02 | 250/585 |
| 5,180,917 A * | 1/1993 | Wraight | G01T 1/185 | 250/252.1 |
| 5,371,377 A * | 12/1994 | Struye | G01T 1/2016 | 250/581 |
| 5,420,441 A * | 5/1995 | Newman | G01T 1/2014 | 250/252.1 |
| 5,422,208 A * | 6/1995 | Kojima | G03C 5/17 | 250/588 |
| 5,440,146 A * | 8/1995 | Steffen | G03B 42/02 | 250/580 |
| 5,561,698 A * | 10/1996 | Mick | A61B 6/583 | 378/162 |
| 5,796,904 A * | 8/1998 | Marinelli | G02B 6/4416 | 385/100 |
| 6,140,663 A * | 10/2000 | Neary | G03B 42/02 | 250/588 |
| 6,670,619 B2 * | 12/2003 | Waluszko | A61L 2/0011 | 250/365 |
| 7,057,200 B2 * | 6/2006 | Trzcinski | G01T 1/2014 | 250/588 |
| 7,339,183 B1 * | 3/2008 | Hecker | A61B 6/00 | 250/583 |
| 2001/0010364 A1 * | 8/2001 | Lee | G01T 1/2985 | 250/584 |
| 2004/0140453 A1 * | 7/2004 | Devenney | A61B 6/4216 | 252/301.4 H |
| 2004/0164257 A1 * | 8/2004 | Sayag | G11C 13/04 | 250/584 |
| 2005/0045815 A1 * | 3/2005 | Bui | H01J 49/0004 | 250/282 |
| 2005/0116179 A1 * | 6/2005 | Aguirre | A61C 19/004 | 250/492.1 |
| 2005/0247898 A1 * | 11/2005 | Yonekawa | G03B 42/02 | 250/589 |
| 2006/0284125 A1 * | 12/2006 | Alzner | G03B 42/02 | 250/588 |
| 2007/0023710 A1 * | 2/2007 | Tom | A61L 2/10 | 250/504 R |
| 2008/0035839 A1 * | 2/2008 | Struye | G01T 1/2014 | 250/252.1 |
| 2008/0258087 A1 * | 10/2008 | Alzner | G03B 42/08 | 250/584 |
| 2009/0050925 A1 * | 2/2009 | Kuramoto | H01L 33/486 | 257/100 |
| 2009/0078892 A1 * | 3/2009 | Corby, Jr. | G01V 5/0016 | 250/582 |
| 2009/0078893 A1 * | 3/2009 | Umemura | G03B 42/02 | 250/589 |
| 2011/0049371 A1 * | 3/2011 | Kobayashi | G01T 1/2018 | 250/361 R |
| 2012/0043471 A1 | 2/2012 | Harpring et al. | | |
| 2012/0112099 A1 * | 5/2012 | Coleman | G01T 1/08 | 250/473.1 |
| 2014/0023842 A1 * | 1/2014 | Urushiyama | C09K 11/586 | 428/215 |
| 2014/0131595 A1 * | 5/2014 | Nathan | A61L 2/0047 | 250/504 R |
| 2016/0123886 A1 * | 5/2016 | Jaffe | G01N 21/6458 | 250/458.1 |
| 2016/0170034 A1 * | 6/2016 | Bobbitt, III | G01T 1/08 | 250/475.2 |

* cited by examiner

IMAGE PLATE CALIBRATION SYSTEM

FEDERAL RESEARCH STATEMENT

This invention was made with Government support under Contract No. DE-AC09-085R22470, awarded by the U.S. Department of Energy. The Government has certain rights in the invention.

FIELD OF THE INVENTION

The present invention generally involves a calibration system for an image plate used to detect high-energy particles (e.g., x-rays or gamma rays) produced by a radioisotope.

BACKGROUND OF THE INVENTION

The use of radioactive material may result in radiation and/or contamination areas in such areas as reactors, fuel and isotope processing facilities, laboratories, glove boxes, isolators, and other rooms in which the radioactive material is handled. Image plates or films that are responsive to radiation may be incorporated into instruments used to survey the affected areas. For example, an image plate that incorporates Phosphorous Storage Plate (PSP) technology may accumulate radiation from exposure to radiation and background light. As used herein, "radiation" means high-energy particles, such as alpha particles, beta particles, neutrons, x-rays, gamma rays, or UV rays, produced by a radioisotope. These accumulated exposures may thus provide a quantitative measurement of radiation present in a particular area.

Commercially available imaging plate readers are designed for high energy x-rays from a nearby source, such as x-ray machines commonly found in doctors' offices. As such, the readers have a minimum exposure intensity threshold before they are able to read the imaging plate. When used to identify contamination, the energy levels can be significantly less, resulting in an exposure that is below the reader's minimum threshold. Therefore, a calibration system that can establish a baseline exposure for an image plate would be useful. This baseline exposure may raise the entire plate to about the minimum threshold of the reader so that additional exposure from a contamination source can be read by the reader.

BRIEF DESCRIPTION OF THE INVENTION

Aspects and advantages of the invention are set forth below in the following description, or may be obvious from the description, or may be learned through practice of the invention.

One embodiment of the present invention is a calibration system for an image plate used to detect high-energy particles produced by a radioisotope. The calibration system includes a casing, and an image plate holder is disposed at least partially inside the casing. The image plate is retained by the image plate holder inside the casing. A calibration source generates energy inside the casing.

Another embodiment of the present invention is a calibration system for an image plate used to detect high-energy particles produced by a radioisotope. The calibration system includes a casing and an image plate holder disposed at least partially inside the casing. The image plate is retained by the image plate holder inside the casing. An index on the image plate holder locates the image plate holder in the casing, and a calibration source generates energy inside the casing.

In yet another embodiment, the calibration system includes a casing and an image plate holder disposed at least partially inside that casing, wherein the image plate is retained by the image plate holder inside the casing. An access port through the casing allows the image plate holder to fit through the access port. An index on the image plate holder locates the image plate holder in the casing. An image plate detent engages with the index on the image plate holder, and a calibration source generates energy inside the casing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
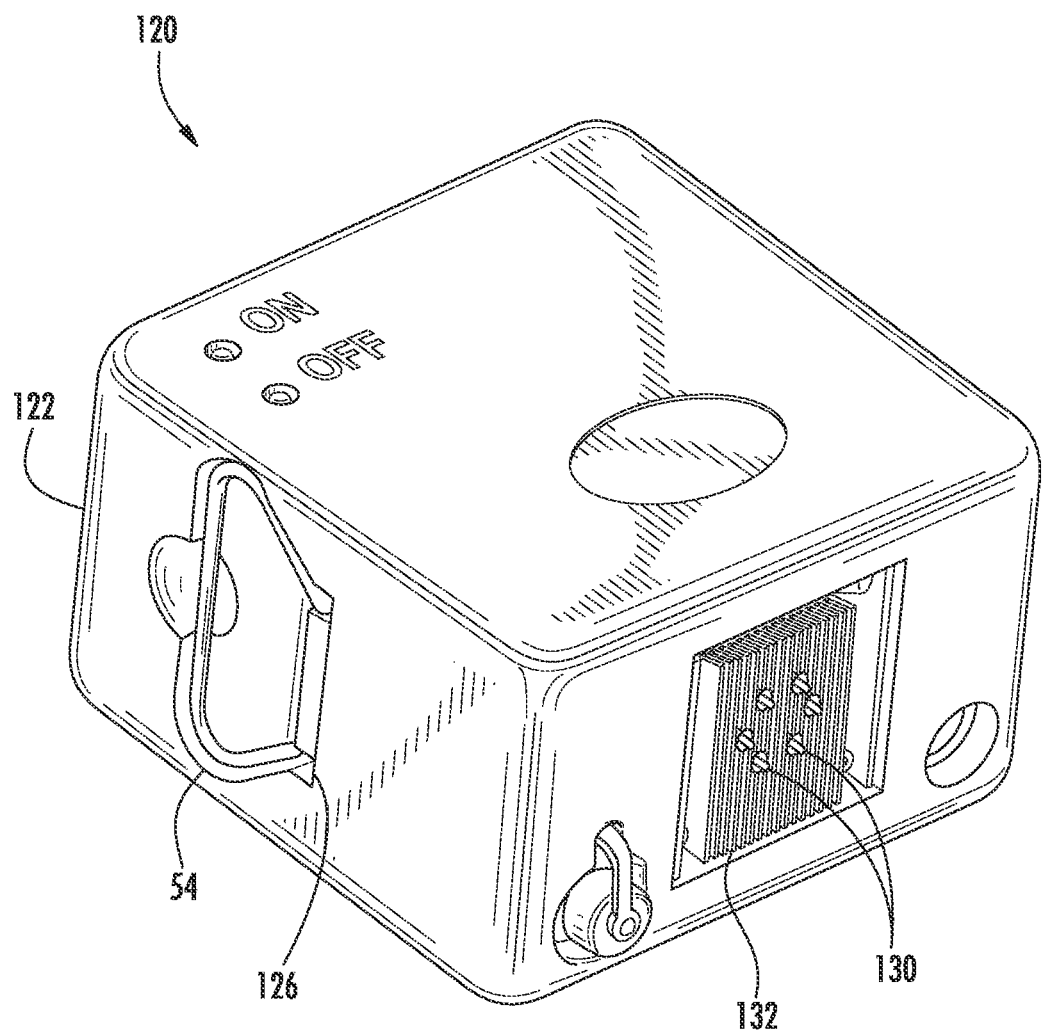
FIG. 1 is a perspective view of a calibration system for an image plate according to an embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Image plates that incorporate Phosphorous Storage Plate (PSP) technology accumulate radiation from multiple exposures and background light until erased. Embodiments of the present invention include a calibration or illumination system for an image plate used to detect high-energy particles (e.g., x-rays or gamma rays) produced by a radioisotope.

Figure 2:
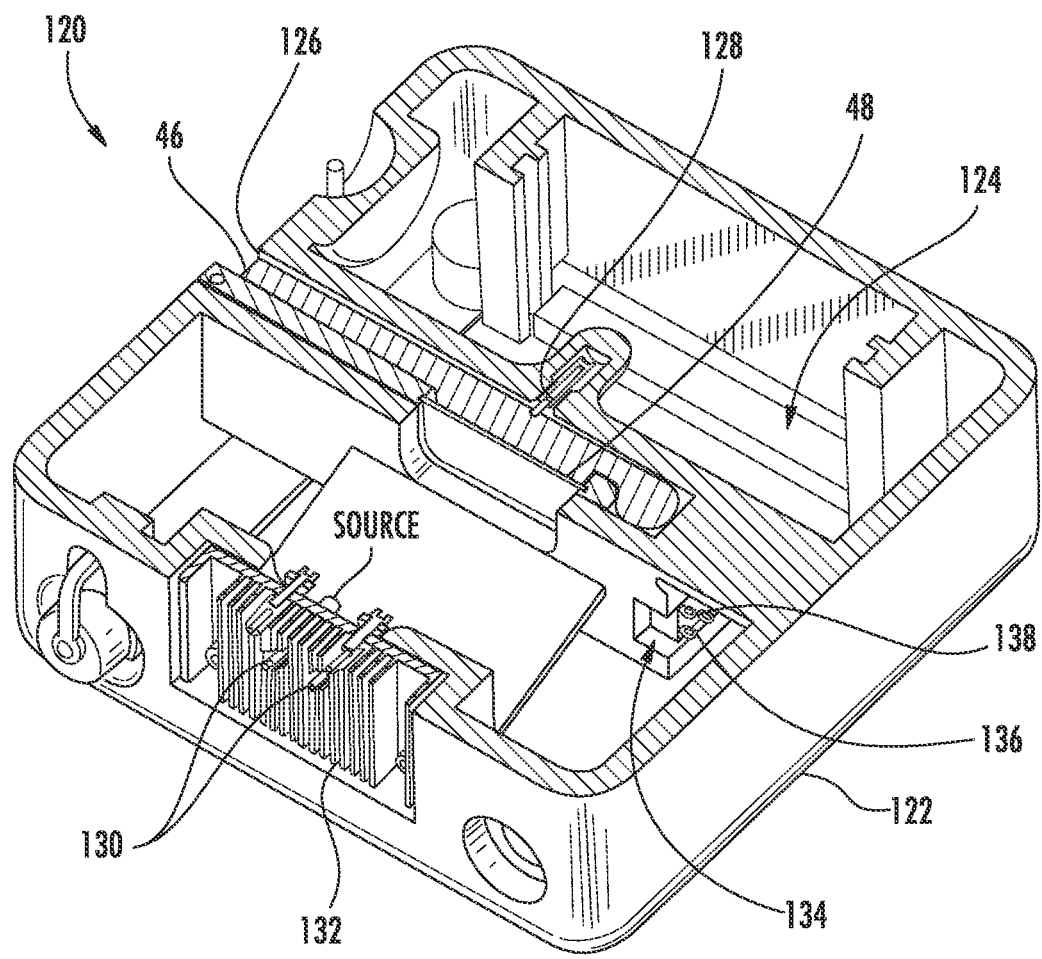
FIG. 2 is a top perspective cross-section of the calibration system shown in FIG. 1.

FIG. 1 provides a perspective view of a calibration system 120 for an image plate 48 according to an embodiment of the present invention, and FIG. 2 provides a top perspective cross-section of the calibration system 120 shown in FIG. 1. As shown in FIGS. 1 and 2, the calibration system 120 includes a casing 122 that defines an interior volume 124 to shield internal components from exposure to ambient light. For example, the casing 122 may shield the image plate 48 from direct or indirect exposure to ambient light. In particular embodiments, the casing 122 may be impervious to ambient light. The particular size and shape of the casing 122 may vary according to the geometry of the image plate 48 and any associated image plate holder 46 being used. In the particular embodiment shown in FIGS. 1 and 2, the casing 122 generally defines an enclosure constructed from plastic or metal, depending on weight, shielding, and durability considerations. In particular embodiments, the casing 122 may be a single-piece construction, such as through 3D printing. A single-piece construction reduces manufacturing costs while also providing enhanced strength and improved internal tolerances compared to a multi-piece construction.

Figure 3:
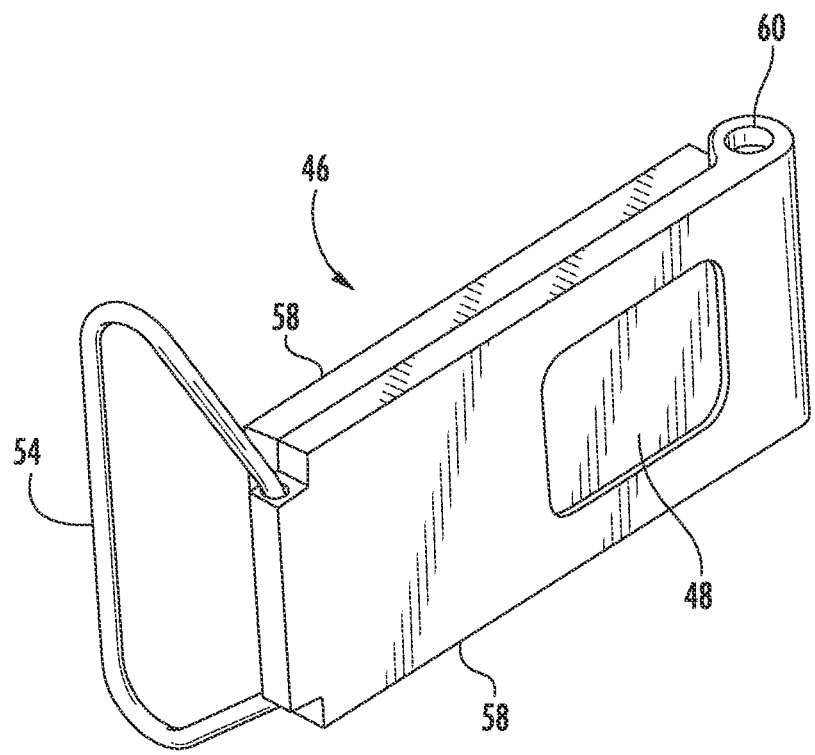
FIG. 3 is a perspective view of an image plate holder and image plate according to one embodiment of the present invention.
Figure 4:
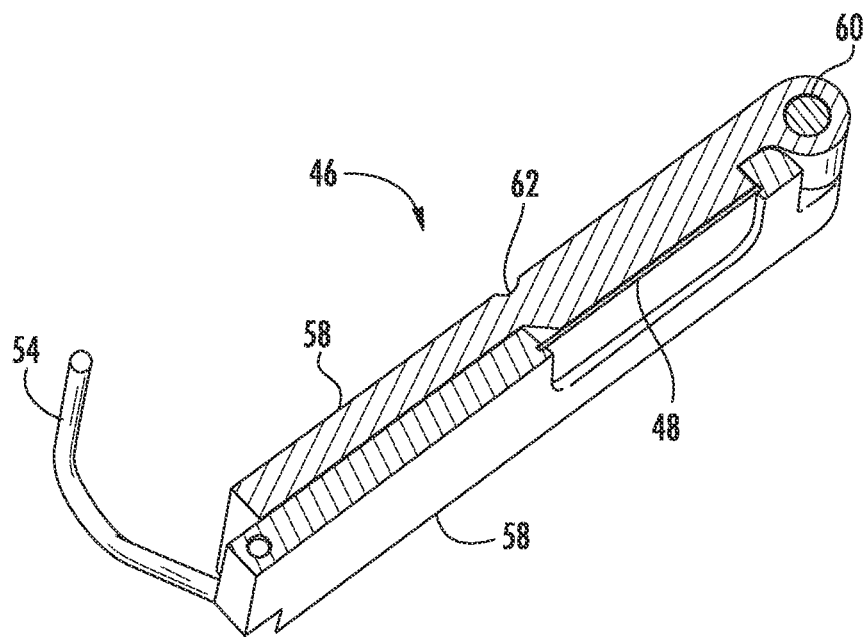
FIG. 4 is a perspective cross-section view of the image plate holder and image plate shown in FIG. 3.

The calibration system 120 may further include an image plate holder 46 to facilitate installation and removal of the image plate holder 46 and image plate 48 with respect to the casing 122. FIG. 3 provides a perspective view of the image plate holder 46 and image plate 48 according to one embodiment of the present invention, and FIG. 4 provides a perspective cross-section view of the image plate holder 46 and image plate 48 shown in FIG. 3. As shown in FIGS. 3 and 4, the image plate holder 46 provides a storage cartridge for the image plate 48 to facilitate installation and removal of the image plate holder 46 and image plate 48 with respect to the casing 122. A handle 54 may be operably connected to the image plate holder 46 to facilitate installation and removal of the image plate holder 46 from the casing 122.

The actual size and construction of the image plate holder 46 may vary according to the particular casing 122 design and characteristics of the particular image plate 48 being used. For example, the image plate 48 may include one or more radiation sensitive film layers sandwiched between attenuation layers. The geometry, number, and thickness of the film layers and attenuation layers may be selected based on the anticipated source and/or energy level present in the radiation. In particular embodiments, for example, the film layers may include x-ray imaging photographic film used in conventional medical applications. Alternately or in addition, the film layers may include Phosphorous Storage Plate (PSP) technology as described in U.S. Patent Publication 2012/0112099 and assigned to the same assignee as the present application, the entirety of which is incorporated herein for all purposes. The attenuation layers may be similarly selected to partially shield radiation that passes through the film layers. Suitable attenuation layers may include, for example, metal, plastic, or glass, depending on the anticipated source and/or energy level present.

The attenuation layers produce a different exposure for each film layer exposed to radiation. For example, radiation exposed to the image plate 48 will produce the largest exposure in the outermost film layer, with progressively decreasing exposures to each interior film layer, depending on the particular attenuation layer between each film layer. The number of film layers and attenuation coefficients for the attenuation layers may be varied as desired to achieve a desired sensitivity to radiation and/or discrimination of different energy levels. After an exposure to radiation, the image plate 48 may be removed from the image plate holder 46 for analysis, and the amount and/or energy level of the radiation present may be calculated based on the known attenuation layers and different exposures received by each film layer.

The image plate holder 46 may be constructed from tungsten, copper, lead, aluminum, aluminum alloys, plastic, or other material that may supplement the shielding around the image plate 46. The thickness of the image plate holder 46 may be selected or adjusted to accommodate the thickness of the image plate 48 while still holding the image plate 48 in the desired geometry to produce the desired focus and size on the image plate 48. For example, referring to FIGS. 3 and 4, the image plate holder 46 may include two complementary sections connected by a hinge 60, with the thickness of the sections selected to hold the image plate 48 securely in place. The image plate holder 46 may further include a locating index 62 that engages with a complementary image plate detent 128 (shown in FIG. 2), spring, or other press fitting between the casing 122 and the image plate holder 46 or image plate 48 to provide a positive indication that the image plate holder 46 is fully and properly installed inside the casing 122. In addition, the locating index 62 and/or image plate detent 128 may assist ensuring that the image plate holder 46 has been inserted in the correct orientation inside the casing 122.

Returning to FIGS. 1 and 2, an access port 126 into the casing 122 may allow the image plate holder 46 and image plate 48 to fit through the access port 126 and into the casing 122, with the handle 54 extending at least partially outside of the casing 122. In this manner, installation and removal of the image plate holder 46 and image plate 48 with respect to the casing 122 may be easily accomplished without opening the casing 122. The calibration system 120 may further include an image plate detent 128, spring, or other press fitting between the casing 122 and the image plate holder 46 or image plate 48 to provide a positive indication that the image plate holder 46 is fully and properly installed inside the casing 122.

A calibration source 130 disposed in the casing 122 generates a suitable form of energy that can be received or absorbed by the image plate 48 to establish a new baseline of exposure for the image plate 48. In particular embodiments, for example, the calibration source may produce ultraviolet light inside the casing 122 for reception or absorption by the image plate 48. In other particular embodiments, the calibration source may produce visible light, infrared light, radiation source, or another form of energy suitable for establishing a new baseline exposure for the image plate 48. If desired, a heat sink 132 may be located proximate to the calibration source 130 to dissipate heat produced by the calibration source 130.

The application of energy to the image plate 48 provides a baseline exposure to the image plate 48 that brings the recorded energy intensity on the plate to approximately the minimum intensity threshold of the reader. If the baseline exposure is at the minimum threshold or below it, then when the plate is read, the resulting image is just that of the radiation sources being measured. If the baseline exposure is higher than the threshold, or is non-uniform, then a baseline exposure reading can be subtracted from the deployed imaging plate to get a resulting image of just the radiation sources being measured if desired.

As shown in FIG. 2, the calibration system 120 may further include an interlock 134 inside the casing 122 and operably engaged with the image plate holder 46 to automate operation of the system 120. The interlock 134 may include, for example, a first switch 136 that senses the condition when the image plate holder 46 is fully inserted in the casing 122 to energize the calibration source 130 and a corresponding ON indicator on the outside of the casing. The interlock 134 may also include a second switch 138 that senses the condition when the image plate holder is not fully inserted into the casing to de-energize the calibration source 130 and energize a corresponding OFF indicator on the outside of the casing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A calibration system for an image plate used to detect high-energy particles produced by a radioisotope, wherein the high-energy particles comprise at least one of alpha particles, beta particles, neutrons, x-rays, gamma rays, or ultraviolet rays, comprising:
    a casing, the casing defining an access port and a slot extending from the access port and extending internally within the casing, the slot defining a first surface and a second surface with a space therebetween, the casing comprising a detent, a spring, or a press fitting that extends into the slot;
    an image plate holder configured for removable insertion within the slot such that a first side of the image plate holder is adjacent to the first surface of the slot and a second opposite side of the image plate holder is adjacent to the second surface of the slot, the image plate holder defining an opening for exposing at least a portion of an image plate retained therein, the image plate holder defining a mating surface for mating with the detent, spring, or press fitting upon insertion of the image plate holder into the slot, the image plate holder further comprising a handle operably connected thereto, wherein the handle extends at least partially outside of the access port upon insertion of the image plate holder into the slot; and
    a calibration source that generates energy inside said casing, the calibration source being located within the casing such that the energy is directed to the opening of the image plate holder upon insertion of the image plate holder into the slot with the mating surface mated with the detent, spring, or press fitting.

2. The system as in claim 1, further comprising a heat sink proximate to said calibration source.

3. The system as in claim 1, further comprising an interlock inside said casing and operably engaged with said image plate holder, wherein said interlock has a first condition when said image plate holder is fully inserted in said casing that energizes said calibration source.

4. The system as in claim 3, wherein said interlock has a second condition when said image plate holder is not fully inserted into said casing that de-energizes said calibration source.

5. The system as in claim 1, wherein said calibration source is an ultraviolet light.

6. The system as in claim 1, wherein said casing is impervious to ambient light.

7. The system of claim 1, further comprising an index on said image plate holder for locating said image plate holder in said casing.

* * * * *